United States Patent
Ruan et al.

(10) Patent No.: US 7,984,333 B2
(45) Date of Patent: Jul. 19, 2011

(54) METHOD AND APPARATUS FOR PROACTIVE ALERT GENERATION VIA EQUIVALENT MACHINE CONFIGURATION DETERMINATION FROM PROBLEM HISTORY DATA

(75) Inventors: Yaoping Ruan, White Plains, NY (US); Debanjan Saha, Mohegan Lake, NY (US); Sambit Sahu, Hopewell Junction, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 12/263,217

(22) Filed: Oct. 31, 2008

(65) Prior Publication Data
US 2010/0115340 A1    May 6, 2010

(51) Int. Cl.
    *G06F 11/00* (2006.01)
(52) U.S. Cl. ............... 714/37; 714/26; 714/33; 714/47.1
(58) Field of Classification Search .............. 714/2, 25, 714/26, 33, 37, 47, 48, 47.1
See application file for complete search history.

(56) References Cited

U.S. PATENT DOCUMENTS

| | | | | |
|---|---|---|---|---|
| 5,983,364 A * | 11/1999 | Bortcosh et al. | ............... | 714/25 |
| 6,006,016 A * | 12/1999 | Faigon et al. | ............... | 714/26 |
| 6,353,902 B1 * | 3/2002 | Kulatunge et al. | ............... | 714/47 |
| 6,742,141 B1 * | 5/2004 | Miller | ............... | 714/26 |
| 7,526,684 B2 * | 4/2009 | Bicknell et al. | ............... | 714/47 |
| 2005/0235058 A1 * | 10/2005 | Rackus et al. | ............... | 714/4 |
| 2007/0067678 A1 * | 3/2007 | Hosek et al. | ............... | 714/25 |
| 2009/0006903 A1 * | 1/2009 | Devitt et al. | ............... | 714/48 |
| 2010/0153790 A1 * | 6/2010 | Matsumoto et al. | ............... | 714/47 |

* cited by examiner

*Primary Examiner* — Robert Beausoliel
*Assistant Examiner* — Joseph D Manoskey
(74) *Attorney, Agent, or Firm* — Scully, Scott, Murphy & Presser, P.C.; Daniel P. Morris, Esq.

(57) ABSTRACT

A method, and system employing the method, initiates proactive maintenance of computer systems and/or devices in a computer network. The method determines the subsystems of the computers and network devices and analyzes their configuration data including their respective subsystems. The method generates maintenance characteristics for the devices, and determines a maintenance event for devices using the maintenance characteristics and the configuration data of the devices. The method initiates a maintenance solution of a device determined to have a problematic configuration.

19 Claims, 3 Drawing Sheets

METHOD AND APPARATUS FOR PROACTIVE ALERT GENERATION VIA EQUIVALENT MACHINE CONFIGURATION DETERMINATION FROM PROBLEM HISTORY DATA

FIELD OF THE INVENTION

The present invention relates to a method, and system employing the method, for monitoring maintenance of devices in a computer network, and more specifically, relates to a method and system for proactive maintenance and monitoring of devices such as computers and network devices in a computer network.

BACKGROUND OF THE INVENTION

Typical enterprise customers have a large number of computers communicating in a computer network which also includes various network devices such as routers, switches and network cards, as well as, associated software. Each machine may host a large number of applications. Timely maintenance of the computers including, for example, a hardware replacement schedule, software and application software upgrades and patch installations are difficult to schedule, as well as, time consuming and costly. Software and hardware upgrades may cause software or hardware conflicts in a computer system or computer network. One reason conflicts may occur is that machine configurations may change over time as various upgrades and patches are installed.

Current information technology (IT) departments' efforts have heretofore been inadequate in remedying the problems discussed above. One IT process management approach includes proactively collecting the states or configurations of computers, then analyzing the computers attempting to determine whether the computers are vulnerable to malfunction. The analysis can be difficult and lacking in accuracy, and typically limited to operating system (OS) level configuration.

Frequently, maintenance is initiated post failure of a hardware or software component. For example, hardware maintenance is initiated after failure of a computer, subsystem, or a network device has occurred. This type of failure causes unexpected data loss and extra costs for backup, recovery, and technician time and cost. One difficulty in maintaining software upgrades is that machine configurations change over time as various software packages are installed, which may introduce incompatibilities. Another problem is that with complexity of modem computer systems/networks, it is often difficult to determine when a device, for example a computer, any of a number of computer subcomponents, and/or network devices, may need to be replaced or updated. A further difficulty is in identifying potential software and hardware conflicts when an upgrade is initiated. These types of conflicts may cause an undesirable system failure.

Therefore, a need exists for a method, and system employing the method, for monitoring and analyzing devices and software, e.g., computers, network devices, and software, such as, OS software, and network protocols, and proactively initiate a maintenance event, such as an a hardware or software upgrade.

SUMMARY OF THE INVENTION

In an aspect of the invention, a method for proactive maintenance of computer systems includes providing a plurality of devices in a network, the devices including computers and network devices communicating with each other using the network; determining the subsystems of the devices including the computers; analyzing configuration data of the devices including their respective subsystems; generating maintenance characteristics for the devices; determining a maintenance event for at least one device using the maintenance characteristics and the configuration data of the devices; and initiating a maintenance solution for at least one device.

In a related aspects, the maintenance solution includes changing a configuration feature of a device. In another related aspect, the step of initiating a maintenance solution includes communicating the maintenance event to a receiving entity to initiate maintenance of a computer. Further, the method may include: receiving malfunction data about a malfunctioning device; and initiating a maintenance solution for the malfunctioning device, including other devices determined to be at risk for malfunctioning, the determination of risk including similarity of the configurations. The malfunction data may be extracted from a problem ticket including data from the malfunctioning device. The method may further include the steps of: determining when at least one computer has a malfunction; receiving malfunction data about the malfunctioning computer; and analyzing the malfunction data.

The configuration data may include hardware data, and software data. Historical data of the devices may be provided which includes maintenance characteristics for the devices. Further, maintenance characteristics may be compared or related to at least one subsystem of a device. The method may further include determining malfunction using a problem ticket initiated from a help desk program embodied on computer readable medium of a helpdesk computer system. Further, the subsystem may be hardware or software. The method may further include the steps of: receiving additional malfunction data; analyzing the additional malfunction data; and relating all the malfunction data to at least one specified subsystem of the computer. The maintenance event may include a software configuration problem. Also, the maintenance event may include a protocol problem. Further, the maintenance event may include a hardware problem. The maintenance event may also include a particular component. The method may further include generating metric parameters; and determining a cluster of computers for maintenance using the metric parameter. The cluster of computers includes a related subsystem to the malfunctioning subsystem. The method may repeat the step of generating maintenance characteristics and repeat the subsequent steps of the method in a period fashion. The step of generating maintenance characteristics for the devices may include data history of maintenance events for the devices. The step of generating maintenance characteristics for the devices may include data history of the devices and of the same devices and/or devices of the same type in another network. The method may further include a history of maintenance events for the devices generating maintenance characteristics for the devices. The method may further include the step of: initiating a maintenance solution for multiple devices in the network.

In another aspect of the invention, a computer program product comprises a computer readable medium having recorded thereon a computer program being executed by a processor in a computer system for proactive maintenance of computer systems and devices communicating with each other using a network, the computer program including the steps of:
determining the subsystems of the devices including the computers; analyzing configuration data of the devices including their respective subsystems; generating maintenance characteristics for the devices; determining a maintenance event for at least one device using the maintenance characteristics and the configuration data of the devices; and initiating a maintenance solution for at least one device.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 1A is block diagram of a problem ticket;

DETAILED DESCRIPTION OF THE INVENTION

Figure 1:
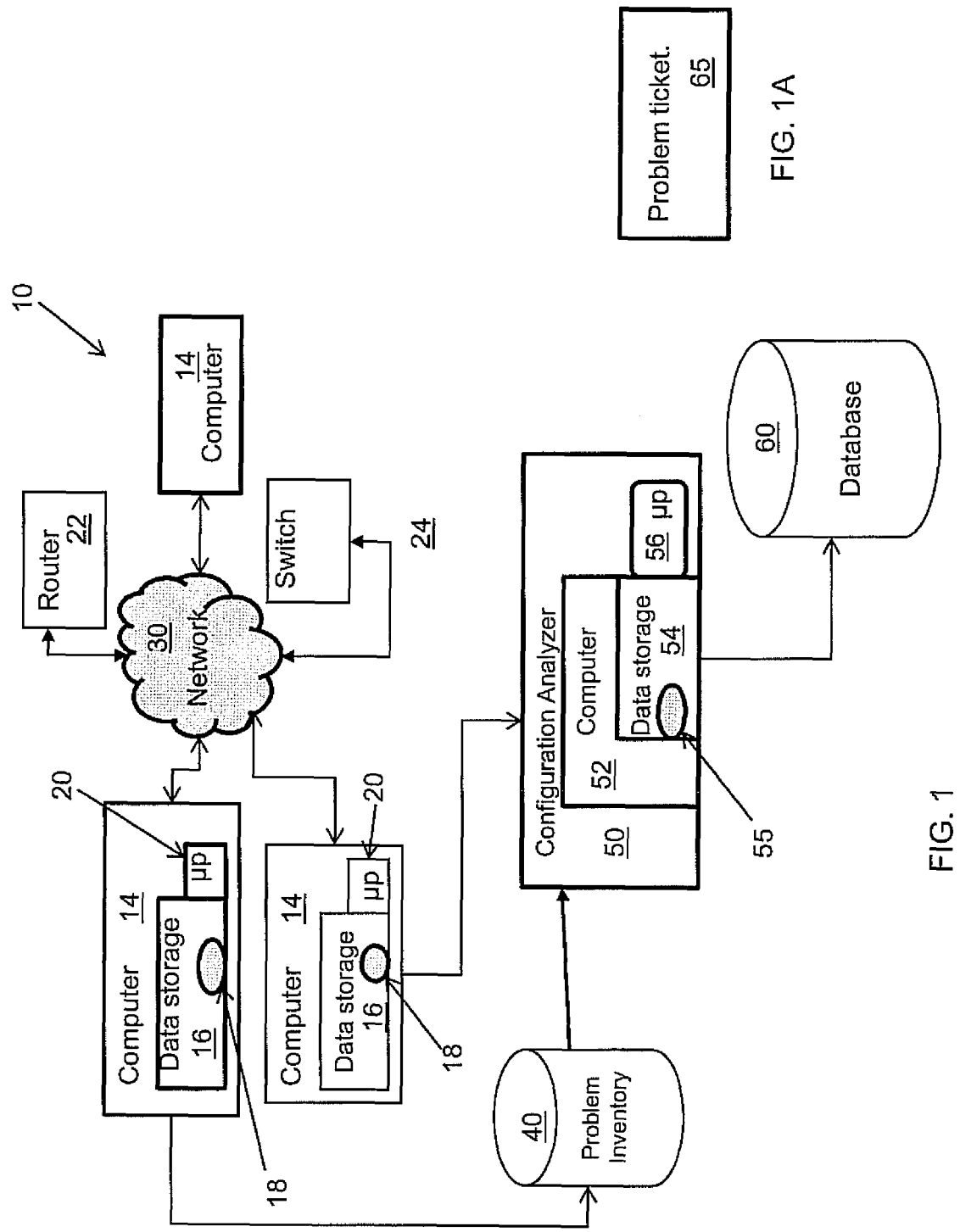
FIG. 1 is a block diagram according to an embodiment of the invention depicting a system for monitoring and generating proactive maintenance events of a computer network.

Referring to FIG. 1, an illustrative embodiment of a computer system 10 according to the present invention includes computers 14 communicating via a network 30. The embodiment shown in FIG. 1 is exemplary, alternative embodiments may include numerous computers and network devices connected, for example, via the Internet, wirelessly, or wired, and using multiple software packages, including multiple protocols, operating systems, and workstation software. In the embodiment shown in FIG. 1, the network includes devices embodied as a router 22 and a switch 24.

The computer system 10, shown in FIG. 1, is configured to receive problem ticket data from a maintenance monitoring system or a help desk program and store the data in the database 40. For example, a problem in the computer system is reported manually or via automated monitoring to a help desk program which may be installed in one of the computers 14 on computer readable medium, e.g., data storage 16 and executed by the computer 14. The help desk program creates a problem ticket 65 (FIG. 1A) and queues the ticket for resolution in the database 40. Once the problem ticket is resolved, a database 60 is updated with the ticket data including the problem, and solution, which may include a brief description about the steps used to fix the problem and the root cause of the problem, e.g., a component failure or a software compatibility issue.

In one embodiment, a two-step approach is used to determine a bad or undesirable configuration for a computer or device. A program 18 is stored on computer readable medium embodied as data storage device 16 in the computers 14, and executed by a processor 20 for gathering configuration data and may include a help desk program. The first step in the program 18 includes an algorithm selecting the computers or devices reporting a problem. It is understood that computers are used representatively herein of network devices, which may include computer, machines or main frames in the network or system of the present invention. The configuration of a computer or device may include a maintenance characteristic analysis to determine elements, e.g., software and hardware, of devices which may need maintenance. The maintenance characteristics analysis may include a statistical analysis of, for example, problem ticket data, and system specifications.

In a second step, a configuration program 55 in a configuration analyzer 50 determines which subsystem of a computer 14 is responsible for a problem ticket. The configuration program 55 is stored on a data storage device 54 of a computer 52 and is executable by a processor 56. For example, if a host is not able to reach a known IP address, the problem is probably related to a subsystem such as networking. Therefore, networking related configurations such as routing tables, domain naming system (DNS) setup, or network adaptor models are recorded from the computer as bad configurations. Further scooping of the responsible configuration is implemented by using additional information such as problem resolution steps. The purpose of this step is to determine the minimal configuration that is responsible for the reported problem. It is understood that a configuration may refer to one or more devices, and software packages, including computers, network machines, protocols, operating systems, or workstation software.

The minimal configuration parameters representing a computer network problem are determined using available information such as a problem ticket description to determine possible components or functionality of the system affected. Problem resolution steps to further isolate the cause of the problem, and thus determine what components are responsible may also be advanced, such as dependencies across the components, i.e., how various components in a computing system interact. As more information becomes available, such as additional data into the database 40 accessed by the configuration analyzer 50, it is possible to direct the analysis of the configuration into finer granularity and higher accuracy. For example, from a problem ticket it might be apparent that the network configuration is the responsible component. If further information such as, transmission control protocol (TCP) performance is found to be the problem, then the problematic configuration can be restrained to the TCP protocol configuration.

In another step, the program 55 determines other machines that have equivalent configurations to the known bad configuration. One method of determining other machines that have equivalent configurations is to find the exact number of matches for the configurations that are of interest, or use a metric to cluster configurations where configurations within a cluster are denoted to be partially equivalent to each other. Metrics can be determined either manually or using a clustering method that determines the dominant components, for example, principle component analysis (PCA), or spectral clustering.

Figure 2:
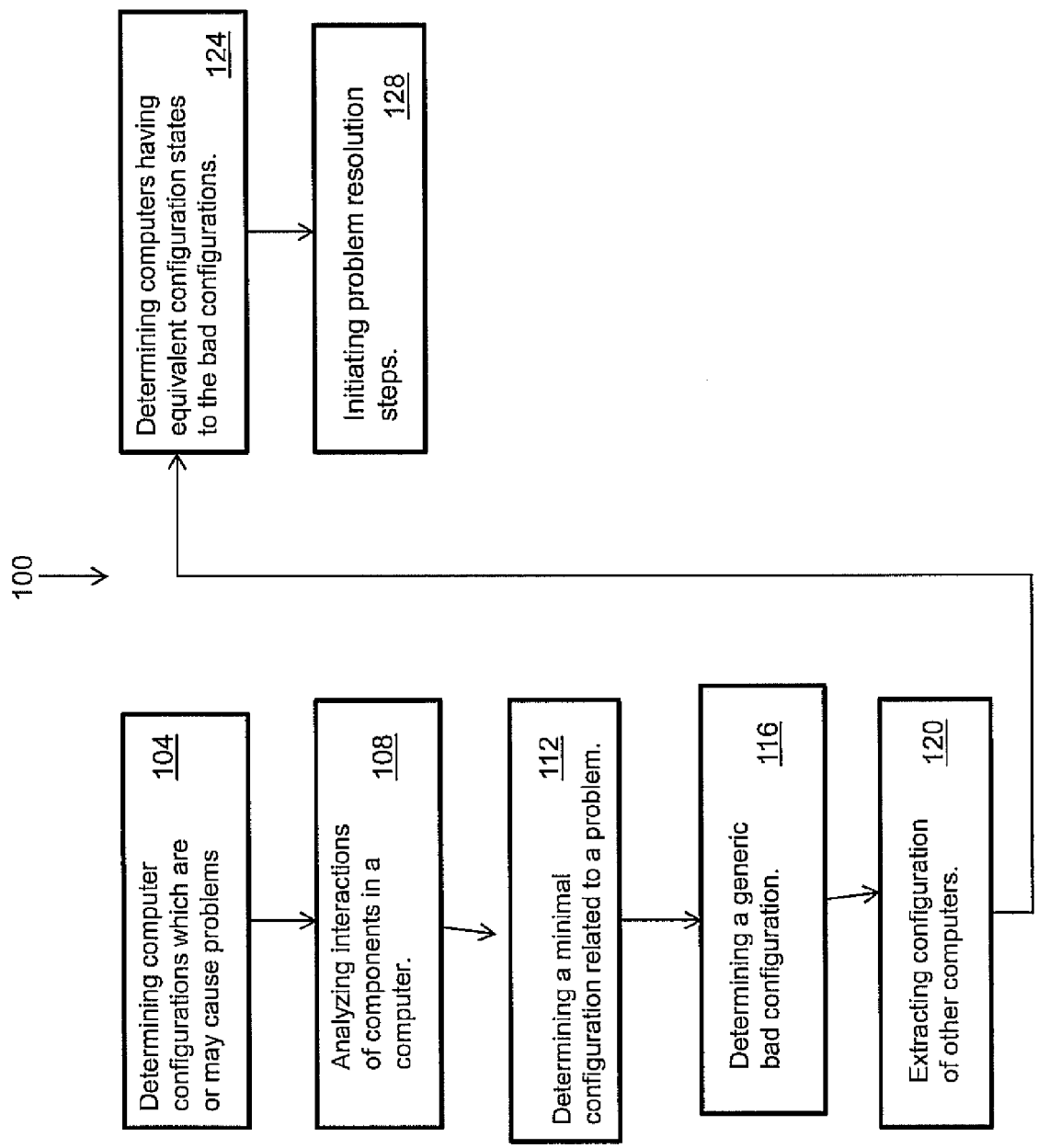
FIG. 2 is a flow chart according to an embodiment of the invention depicting a method for determining potential maintenance requirements based on problems observed in the computer network shown in FIG. 1.

Referring to FIG. 2, an exemplary method 100 according to the invention includes determining computer configurations which are or may cause problems, in step 104, using the configuration analyzer 50. The configuration analyzer 50 conducts an analysis to understand how various components in a computing system interact i.e., dependencies across the components, in step 108. In one example, if more information is available, the configuration analyzer 50 may prune the configuration to additionally narrow the dependencies. The configuration analyzer 50 determines a minimal configuration responsible for the reported problem, as in step 112, and determines which computers have equivalent configuration states to the bad configurations, as in step 116. In step 116, a generic bad configuration and a minimal bad configuration is determined using the configuration analyzer 50 using a set of available information such as a problem ticket description data stored in the database 40 for determining possible components or functionality of a computer system or other affected device. In step 120, configurations of computers 14 are extracted using the configuration analyzer 50 program 55 in combination with the program 18 in the computers to populate the database 60. In step 124, the configuration analyzer 50 determines computers having equivalent configurations states to the bad configuration. Problem resolution steps are initiated to further isolate the cause of the problem and determine what components are responsible for the problem, as in step 128, FIG. 2.

For example, a problem ticket may indicate that network configuration is the responsible component for a problem. If further information such as TPC performance is found to be the problem in the problem determination step 104 (e.g., may be reported in the solution steps for the resolution), then the bad configuration can further be narrowed to, for example, the TCP protocol configurations. Once such a configuration is determined, the configuration may be marked as a generic bad configuration for a given problem ticket, as in step 124, FIG. 2. In step 120, the configuration of other computers is extracted to determine equivalent computer configuration that may have the same problem. The computer configurations are stored in the database 60.

One method for determining other computers which may have equivalent configuration, and thus the same problem, includes finding the exact number of matches for the configurations that are of interest and assigning an equivalency score to the configuration. Then, using the score as a metric to do clustering of configurations where configurations within a cluster are denoted to be equivalent to each other. Examples of methods for determining important configuration parameters include: (i) manual determination; and (ii) any clustering method that determines the dominant components, e.g., PCA, spectral clustering. Using either of these methods, similar configurations can be determined.

Thereby, the system and method of the present invention uses machine configurations which may have reported a problem, such as a component failure or functional problem. The invention determines computers that have similar configurations to the known bad configurations, and can proactively generate alerts for these machines or generate a solution to a problem, for example, a problem of a problem ticket. Thus, the invention includes two determinations: determining a bad configuration, e.g., from problem reporting data; and determining machines that have similar configurations to the known bad configurations. Determination of bad configurations from problem reporting data may be when a problem is reported (either manually or via automated monitoring), generating a problem ticket. The problem ticket is queued into a problem determination system (e.g., a help desk system). In one example, when a problem is reported, a problem ticket is created and queued into the problem determination system for routing to the appropriate entity for problem determination and solution. In this example, the invention makes use of the problem ticket information to determine a bad configuration in a computer or device. The invention determines the machine for which the problem is reported, and then determines which subsystem of the machine is responsible for the problem ticket. For example, if a technician is unable to ping known internet protocol (IP) addresses, the problem subsystem is networking, and thus related configurations are recorded from the computer as bad configuration. Further analysis (or scooping) of the responsible configuration is feasible by using additional information such as problem resolution steps for closed tickets. The purpose of the further analysis is to determine the minimal configuration that is responsible for the reported problem. Once it is determined which computers have similar configurations to the known bad configurations, the system 10 determines other computers that have equivalent configurations to the bad configuration. Thus, determining as accurately as possible what are equivalent states to the bad configuration state is important. Once a computer is indicated as having a bad configuration state by the method of the invention, the computer or computers with equivalent bad configuration states are determined for proactive alert generation.

An exemplary algorithm for extracting bad configuration data is as follows:

```
For problem description of each problem ticket
{
    extract affected component set P {C00, C01, C02 ...}
    if exists problem resolution
    }
    extract responsible component set R{C10, C11 ...}
        for each resolution step
            derive affected component set D{C20, C21 ...} based on
            dependencies
    }
    end if
}
For each component in P{ }, R{ }, and D{ }
{
    remove machine-specific information in the component description,
    output is P'{ }, R'{ }, and D'{ }
}
Merge components in P'{ }, R'{ }, and D'{ }
```

Figure 3:
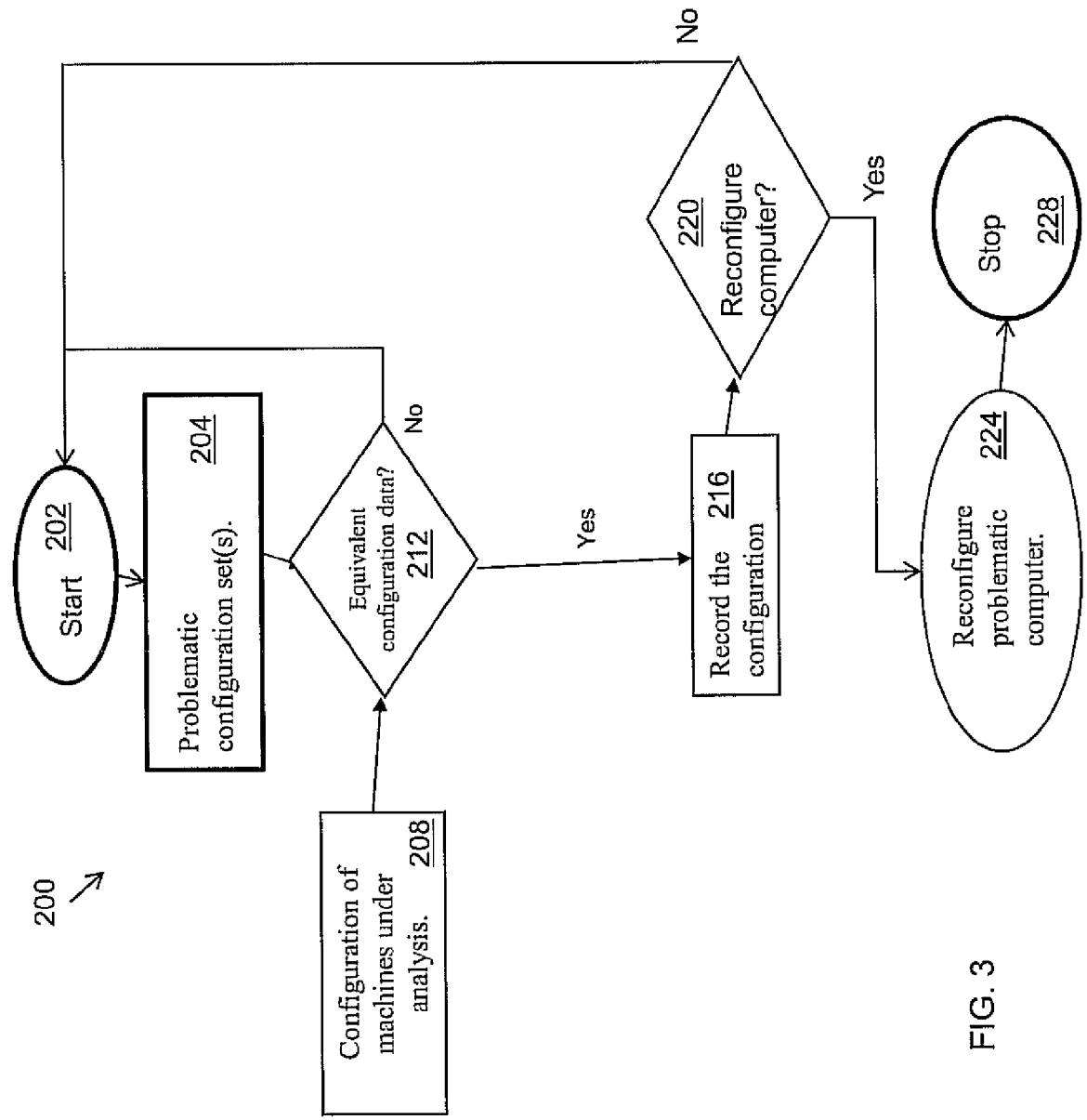
FIG. 3 is a flow chart according to an embodiment of the invention depicting a method of determining similar configurations in computers.

Referring to FIG. 3, another example of a subroutine or method determining similar configurations is depicted in method 200. The method 200 is executed by the configuration analyzer, including computer 52, data storage 54, program 55, and processor 56 for executing the methods 100 and 200 of the present invention (shown in FIG. 1). The method 200 includes determining a problematic configuration set in a computer 14 (FIG. 1) or device, in step 204. Additionally, the method 200 includes determining the configuration of computers included in a set of computers 14 for analysis, in step 208. The configuration analyzer 50 determines if there is configuration data of other computers 14, stored in the database 60, which are equivalent in step 212. If there are not computers 14 with equivalent configurations to the problematic configuration, the method returns to the start step 202. If there are computers 14 with equivalent configurations to the problematic configuration, the method continues to step 216. In step 216, the method 200 records the equivalent configuration in the database 60. The method 200 continues to step 220 to determine if the computer with the equivalent configuration requires reconfiguration, e.g., hardware or software updating, software patch, or any other of numerous changes. If the computer 14 does not need a reconfiguration, the method 200 proceeds back to the start step 202. If the computer 14 does need a reconfiguration, the method continues to step 224, initiating the specified computer 14 for reconfiguration, and then stopping in step 228.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for proactive maintenance of computer systems, comprising:
providing a plurality of devices in a network, the devices including computers and network devices communicating with each other using the network;
determining the subsystems of the devices including the computers;
analyzing configuration data of the devices including their respective subsystems;
generating maintenance characteristics for the devices;
determining a maintenance event for at least one device using the maintenance characteristics and the configuration data of the devices; determining when the at least one device has a malfunction;
receiving malfunction data about the malfunctioning device;
analyzing the malfunction data for the malfunctioning device;
initiating a maintenance solution for the malfunctioning device;
determining other devices at risk for malfunctioning by comparing a device configuration of the malfunctioning device to device configurations of non-malfunctioning devices including comparing the device configuration to subsystems of the non-malfunctioning devices; and
initiating the maintenance solution for the non-malfunctioning devices proactively wherein proactively includes the initiation of the maintenance solution for the non-malfunctioning devices when the malfunction data does not include the non-malfunctioning device.

2. The method of claim 1, wherein the configuration data includes hardware data, and software data, and the maintenance solution includes changing a configuration feature of a device.

3. The method of claim 1, wherein the step of initiating a maintenance solution includes communicating the maintenance event to a receiving entity to initiate maintenance of a computer.

4. The method of claim 1, wherein the malfunction data is extracted from a problem ticket including data from the malfunctioning device.

5. The method of claim 1, providing historical data of the devices including maintenance characteristics for the devices.

6. The method of claim 1, further comprising:
determining malfunction using a problem ticket initiated from a help desk program embodied on computer readable medium of a helpdesk computer system.

7. The method of claim 1, further comprising the steps of:
determining a minimal configuration causing the maintenance event;
the maintenance solution being initiated for the malfunctioning device and for the non-malfunctioning devices which include the minimal configuration.

8. The method of claim 1, wherein the maintenance event includes a software configuration problem.

9. The method of claim 1, wherein the maintenance event includes a protocol problem.

10. The method of claim 1, wherein the maintenance event includes a hardware problem.

11. The method of claim 1, wherein the maintenance event includes a particular component.

12. The method of claim 1, further comprising:
generating metric parameters; and
determining a cluster of computers for maintenance using the metric parameter.

13. The method of claim 12, wherein the cluster of computers include a related subsystem to a malfunctioning subsystem.

14. The method of claim 1, repeating the step of generating maintenance characteristics and repeating the subsequent steps of claim 1, periodically.

15. The method of claim 1, wherein the step of generating maintenance characteristics for the devices includes data history of maintenance events for the devices.

16. The method of claim 1, wherein the step of generating maintenance characteristics for the devices includes data history of the devices and of the same devices and/or devices of the same type in another network.

17. The method of claim 1, further including a history of maintenance events for the devices generating maintenance characteristics for the devices.

18. The method of claim 1, further including the step of:
initiating a maintenance solution for multiple devices in the network.

19. A computer program product comprising a computer readable medium having recorded thereon a computer program being executed by a processor in a computer system for proactive maintenance of computer systems and devices communicating with each other using a network, the computer program comprising the steps of:
determining the subsystems of the devices including the computers;
analyzing configuration data of the devices including their respective subsystems;
generating maintenance characteristics for the devices;
determining a maintenance event for at least one device using the maintenance characteristics and the configuration data of the devices;
determining when the at least one device has a malfunction;
receiving malfunction data about the malfunctioning device;
analyzing the malfunction data for the malfunctioning device;
initiating a maintenance solution for the malfunctioning device;
determining other devices at risk for malfunctioning by comparing a device configuration of the malfunctioning device to device configurations of non-malfunctioning devices including comparing the device configuration to subsystems of the non-malfunctioning devices; and
initiating the maintenance solution for the non-malfunctioning devices proactively wherein proactively includes the initiation of the maintenance solution for the non-malfunctioning devices when the malfunction data does not include the non-malfunctioning device.

* * * * *